(No Model.) 2 Sheets—Sheet 1.
W. W. WYTHE.
HOISTING GEAR.
No. 308,453. Patented Nov. 25, 1884.
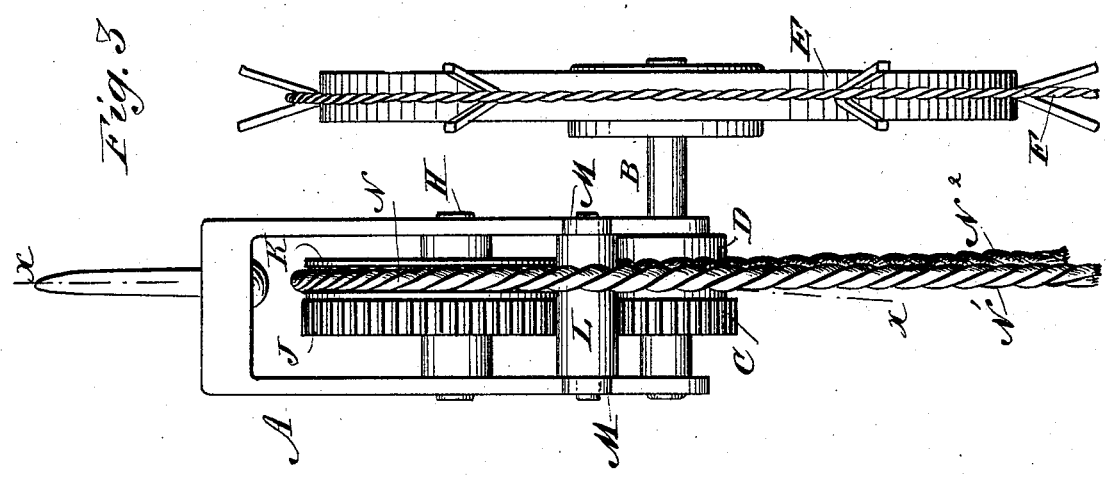
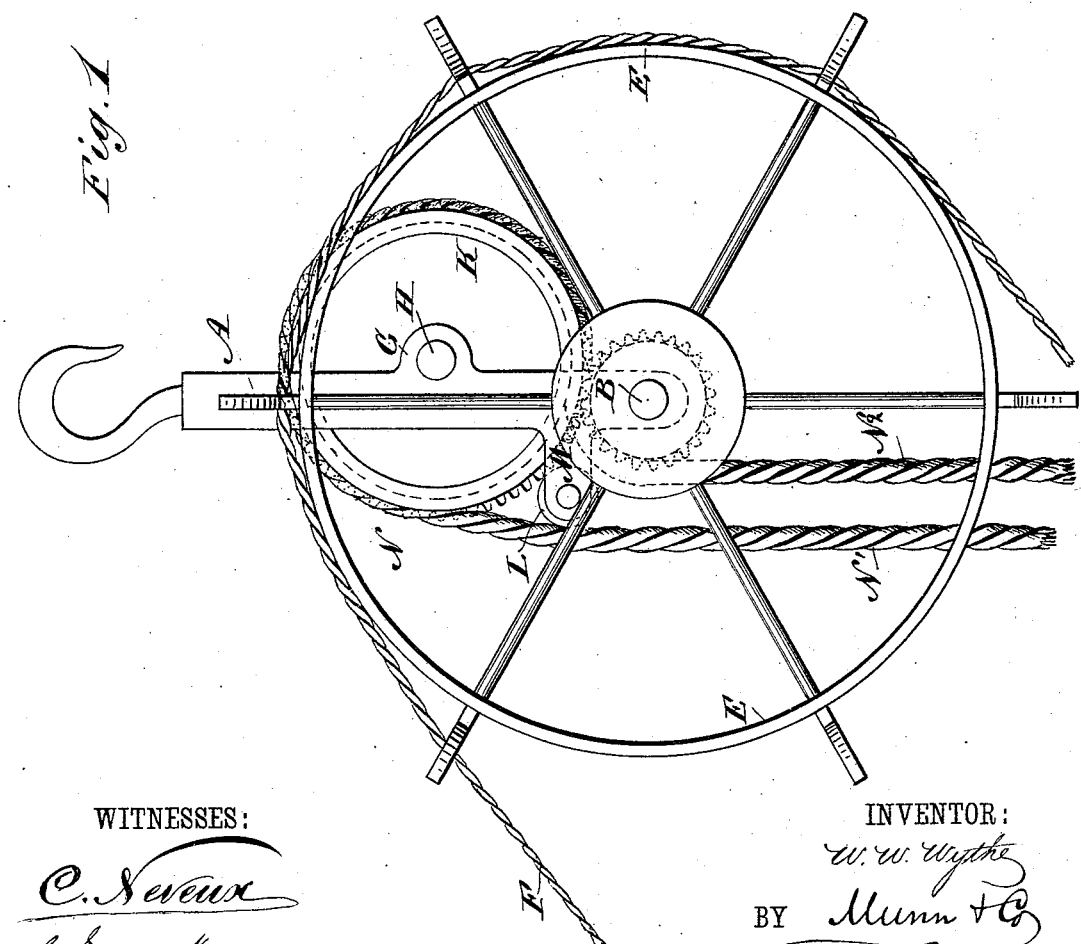
WITNESSES:
C. Neveux
C. Sedgwick
INVENTOR:
W. W. Wythe
BY Munn & Co
ATTORNEYS.

(No Model.) 2 Sheets—Sheet 2.
W. W. WYTHE.
HOISTING GEAR.
No. 308,453. Patented Nov. 25, 1884.
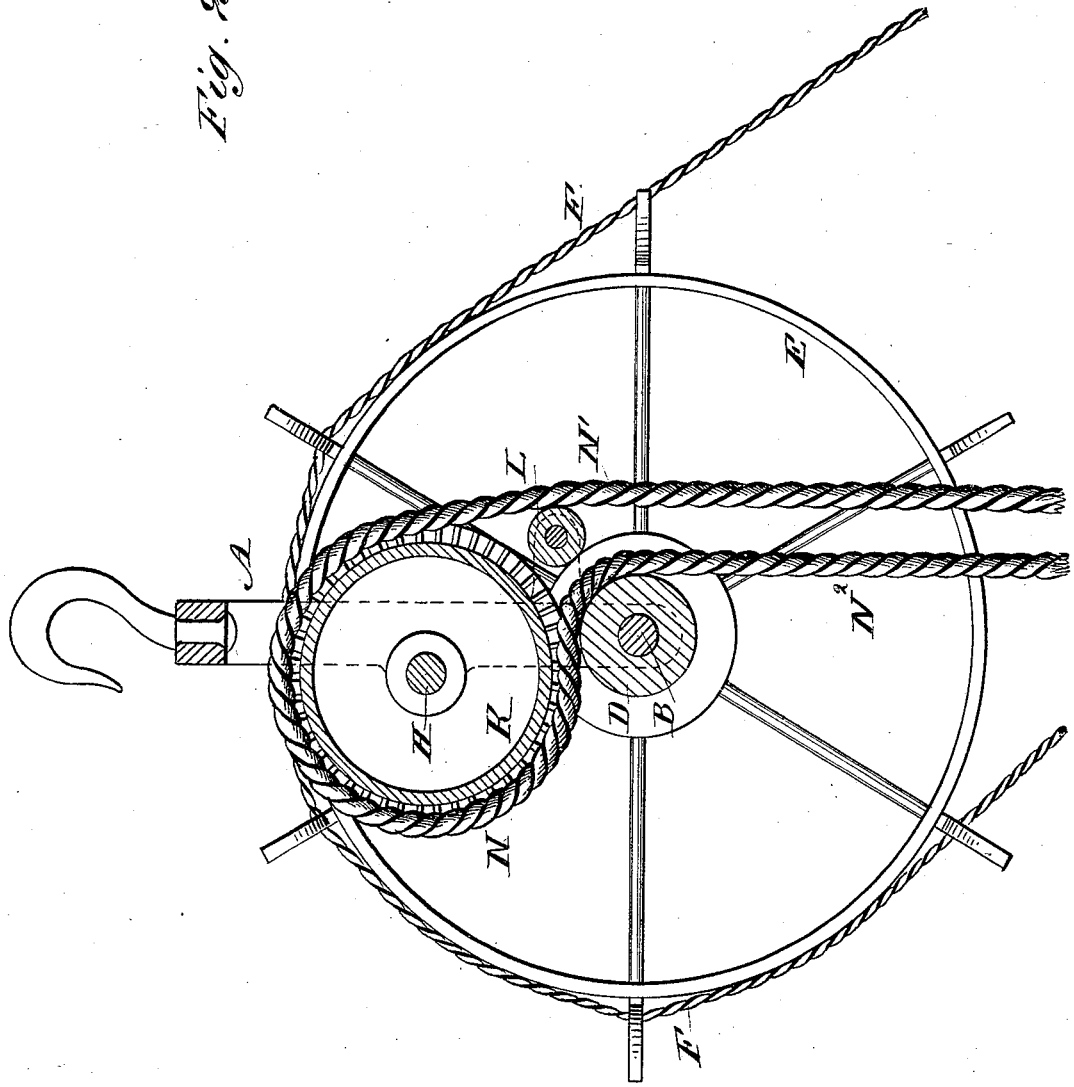
WITNESSES:
C. Neveux
C. Sedgwick
INVENTOR:
W. W. Wythe
BY Munn & Co
ATTORNEYS.

UNITED STATES PATENT OFFICE.

WILLIAM W. WYTHE, OF OCEAN GROVE, NEW JERSEY.

HOISTING-GEAR.

SPECIFICATION forming part of Letters Patent No. 308,453, dated November 25, 1884.

Application filed February 2, 1884. (No model.)

*To all whom it may concern:*

Be it known that I, WILLIAM W. WYTHE, of Ocean Grove, Monmouth county, New Jersey, have invented a new and Improved Hoisting-Gear, of which the following is a full, clear, and exact description.

The object of my invention is to provide a new and improved hoisting-gear in which the rope is pressed on the drum or pulley in such a manner that the rope can hang freely, and will not slip on the pulley when released.

This invention, which is an improvement in the hoisting-gear for which United States Letters Patent No. 268,068 were issued to me on the 28th day of November, 1882, consists in the combination, with a yoke, of a gear-wheel and a grooved pulley united or made integral and journaled in the yoke, and of a gear-wheel and friction-pulley united or made integral and journaled in the lower end of the yoke, the gear-wheels engaging and the friction-pulley pressing the hoisting-rope in the grooved pulley.

Reference is to be had to the accompanying drawings, forming part of this specification, in which similar letters of reference indicate corresponding parts in all the figures.

Figure 1 is a side view of my improved hoisting-gear. Fig. 2 is a longitudinal sectional view of the same on the line $x\ x$, Fig. 3; and Fig. 3 is an end view of the same.

In the lower end of the yoke A a shaft, B, is journaled, in which a gear-wheel, C, and a friction-pulley, D, made integral with the wheel, are mounted rigidly between the shanks of the yoke. On one of the projecting ends of the shaft B the pulley E is rigidly mounted, over which the hand rope or chain F, for operating the gear, passes. In arms G of the shanks of the yoke A a short shaft, H, is journaled, in which are rigidly mounted a gear-wheel, J, engaging with the wheel C, and a grooved pulley, K, made integral with the gear-wheel J. The center of the shaft H is slightly to one side of the center of the shaft B, so that the rims of the gear-wheels C and J will be about on the same vertical line at one side. A pulley or roller, L, is journaled in arms M of the shanks of the yoke. The hoisting-rope N is passed around the grooved pulley K and partly over the friction-pulley D, the load being suspended from the strand N′, passing over the pulley or roller L. The strand N² hangs down loosely and passes under the pulley L. It descends as the strand N′ and the load ascend. If the pulley E is turned by means of the rope or chain F, the gear-wheel C is turned and turns the gear-wheel J and the pulley K. The friction-pulley D always presses the rope N into the groove of the pulley K, thus preventing the rope from slipping when hanging free—that is, the strand N² need not be held to prevent the load from drawing the strand N′ downward. When a load is being raised or lowered, the weight slightly tilts the yoke so that the strands N′ N² hang vertically. The roller or pulley L prevents the weighted strand N′ from pressing on the strand N².

The above-described device can also be used in steering-gear, the wheel or pulley E being the hand-wheel or tiller-wheel.

Having thus described my invention, I claim as new and desire to secure by Letters Patent—

1. In a rope-gear, the combination, with the yoke A, of the gear-wheel J and the grooved rope-pulley K, united or made integral and journaled in the yoke A, the gear-wheel C and the pulley D, united with each other and journaled in the yoke A, and the pulley or roller L, journaled in arms of the yoke A, which pulley L is arranged between the ascending and descending strands of the rope and is not connected with either of the gear-wheels, substantially as herein shown and described.

2. In a hoisting-gear, the combination, with a yoke, of a united pulley and pinion journaled in the lower end of the same, a united pulley and gear-wheel journaled in the yoke above the pinion and pulley, the gear-wheel and pinion engaging, and a roller journaled in the yoke and arranged between ascending and descending strands of the rope passing over the pulley united with the pinion and around the pulley united with the gear-wheel, which roller is entirely independent of either of the gear-wheels, substantially as herein shown and described.

WILLIAM W. WYTHE.

Witnesses:
OSCAR F. GUNZ,
S. C. BURGESS.